(12) United States Patent
Itoh

(10) Patent No.: US 7,618,012 B2
(45) Date of Patent: Nov. 17, 2009

(54) BRACKET FIXING STRUCTURE

(75) Inventor: Tomoki Itoh, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/640,874

(22) Filed: Dec. 19, 2006

(65) Prior Publication Data

US 2007/0145228 A1 Jun. 28, 2007

(30) Foreign Application Priority Data

Dec. 27, 2005 (JP) ............................. 2005-375670

(51) Int. Cl.
*A47B 96/06* (2006.01)
*A47G 29/00* (2006.01)
*A47K 1/00* (2006.01)

(52) U.S. Cl. ............. 248/220.21; 411/171; 248/222.14; 248/224.8

(58) Field of Classification Search ............ 248/220.21, 248/221.11, 222.14, 224.7, 224.8; 411/171, 411/531, 536, 545, 546

See application file for complete search history.

(56) References Cited

U.S. PATENT DOCUMENTS

| 3,798,584 | A | * | 3/1974 | Person | 439/102 |
| 6,089,723 | A | * | 7/2000 | Ogasawara et al. | 359/872 |
| 6,652,108 | B1 | * | 11/2003 | Schillegger | 359/877 |
| 7,192,303 | B2 | * | 3/2007 | Kohen | 439/537 |
| 2006/0110238 | A1 | * | 5/2006 | Tsukui | 411/536 |

FOREIGN PATENT DOCUMENTS

| JP | A-08-175235 | 7/1996 |
| JP | A-10-292844 | 11/1998 |
| JP | A-2000-291510 | 10/2000 |
| JP | A-2003-00448 | 1/2003 |
| JP | A-2003-074625 | 3/2003 |

* cited by examiner

*Primary Examiner*—Amy J. Sterling
(74) *Attorney, Agent, or Firm*—Posz Law Group, PLC

(57) ABSTRACT

A bracket recessed portion of a bracket is inserted into a vehicular jig recessed portion of a vehicular jig, and a washer is put on a face of the bracket through an elastic member on a side opposite from a contact face of the bracket contacting the vehicular jig. The bracket is fixed by inserting a screw into a washer screw hole, an elastic member screw hole, a bracket screw hole and an attachment member screw hole from a side of the washer opposite from a contact face of the washer contacting the bracket. Thus, vibration of the bracket can be damped economically.

10 Claims, 2 Drawing Sheets

BRACKET FIXING STRUCTURE

CROSS REFERENCE TO RELATED APPLICATION

This application is based on and incorporates herein by reference Japanese Patent Application No. 2005-375670 filed on Dec. 27, 2005.

BACKGROUND OF THE INVENTION

The present invention relates to a fixing structure of a bracket. Specifically, the present invention relates to a fixing structure of a bracket used when a sensor unit or a motor is mounted to a vehicle through the bracket.

There is a supporting bracket used under a situation that causes vibration, for example, as described in JP-A-H10-292844 as shown in FIG. 4. The supporting bracket 2 is used to mount a vibration generating body 4 such as a motor to an attachment part 3 such as a vehicle body. The supporting bracket 2 has damping panels 1 incorporating piezoelectric-crystal elements. The damping panel 1 has a controller for controlling distortion amounts of the piezoelectric-crystal elements.

The controller perceives deformation of the supporting bracket 2 due to the vibration with the piezoelectric-crystal elements and generates inner stress in the piezoelectric-crystal elements in a direction for restraining or promoting the deformation in accordance with the deformation amount of the supporting bracket 2. Thus, an apparent spring constant of the supporting bracket 2 can be freely changed to damp the vibration of the supporting bracket 2.

However, this technology requires the piezoelectric-crystal elements, the controller for controlling the distortion amounts of the piezoelectric-crystal elements and the like, increasing a cost.

SUMMARY OF THE INVENTION

It is an object of the present invention to provide a fixing structure of a bracket capable of economically damping vibration of the bracket.

According to an aspect of the present invention, a bracket fixing structure includes a bracket, an attachment member, a screw and a washer. The attachment member is formed with an annular attachment member recessed portion, an attachment member protruding portion surrounded by the attachment member recessed portion, and an attachment member screw hole in the attachment member protruding portion. The bracket is formed with an annular bracket recessed portion corresponding to the attachment member recessed portion, a bracket protruding portion surrounded by the bracket recessed portion, and a bracket screw hole in the bracket protruding portion. The washer is formed with a washer screw hole and a fixing portion extending at least from the bracket protruding portion to an outer periphery of the bracket recessed portion. The bracket is fixed by inserting the bracket recessed portion into the attachment member recessed portion, by putting the washer on a face of the bracket opposite to a contact face of the bracket contacting the attachment member, and by inserting the screw into the washer screw hole, the bracket screw hole and the attachment member screw hole from a side of the washer opposite to a contact face of the washer contacting the bracket.

Thus, an area in which the bracket is fixed to the attachment member can be increased, so resonance frequency can be increased. As a result, vibration of the bracket can be damped economically. Moreover, by damping the vibration of the bracket, resonance fracture of the bracket can be inhibited.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
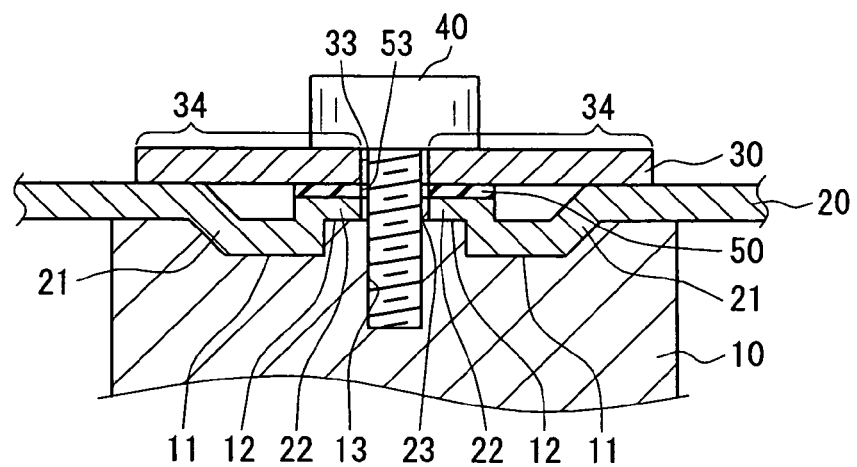
FIG. 1 is a sectional view showing a fixing structure of a bracket according to an example embodiment of the present invention.

Referring to FIG. 1, a fixing structure of a bracket 20 according to an example embodiment of the present invention is illustrated. The fixing structure of the bracket 2 according to the present embodiment includes an attachment member 10, the bracket 20, a washer 30, a screw 40, an elastic member 50 and the like.

In the present embodiment, the attachment member 10 is a vehicular jig. The vehicular jig 10 is a fixing jig used when the bracket 20 is fixed to a vehicle. As shown in FIG. 1, the vehicular jig 10 is formed with a vehicular jig recessed portion 11, which is a continuous annular recessed portion, a vehicular jig protruding portion 12 surrounded by the vehicular jig recessed portion 11, a vehicular jig screw hole 13 and the like. Alternatively, the attachment member 10 may be a vehicle body.

Figure 2:
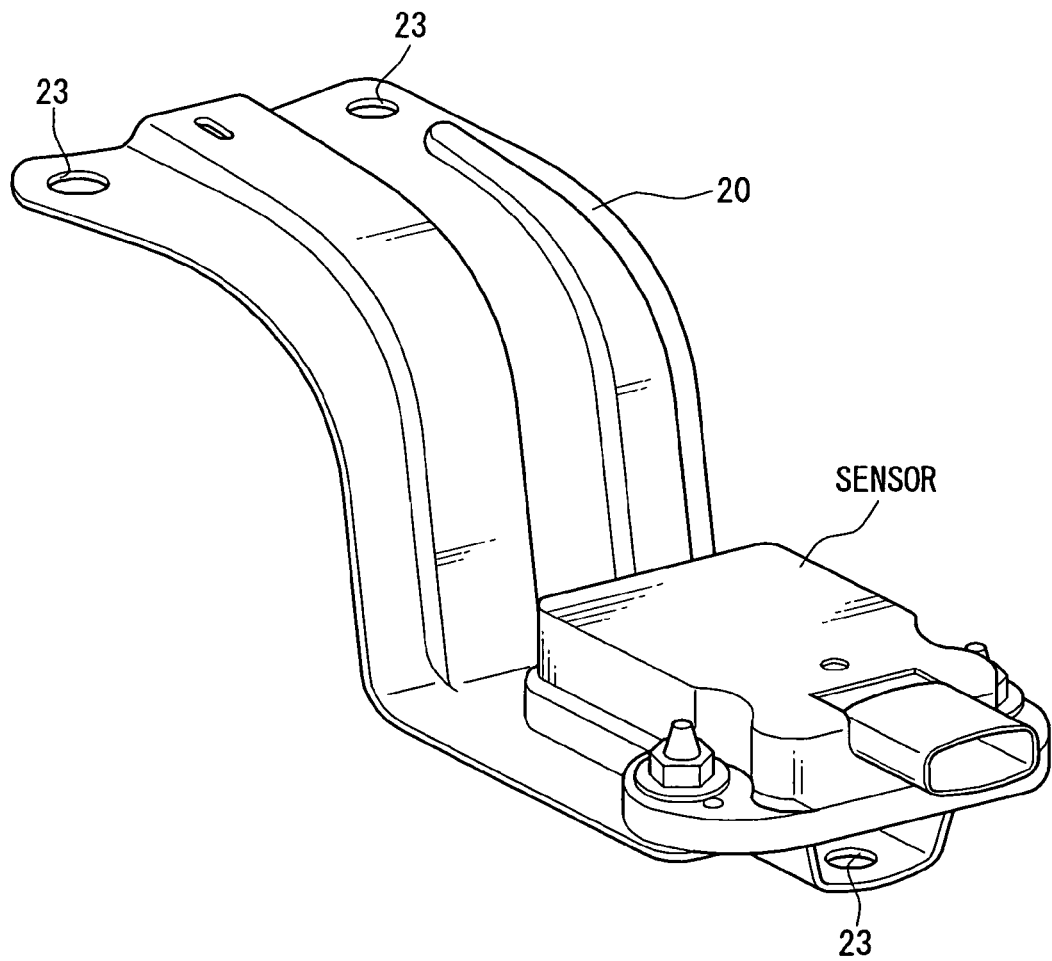
FIG. 2 is a schematic view showing the bracket according to the FIG. 1 embodiment.

The bracket 20 is formed with a bracket recessed portion 21, which is a continuous annular recessed portion, corresponding to the vehicular jig recessed portion 11, a bracket protruding portion 22 surrounded by the bracket recessed portion 21, a bracket screw hole 23 in the bracket protruding portion 22 at a position corresponding to the vehicular jig screw hole 13 and the like. As shown in FIG. 2, a sensor unit, a motor or the like is fixed on a portion of the bracket 20 other than the portion fixed to the vehicular jig 10. The bracket recessed portion 21 and the bracket protruding portion 22 are not shown in FIG. 2.

A top face of the bracket protruding portion 22 is spaced away from a plane defined by a rim of the bracket recessed portion 21. Thus, contact between the washer 30 and the bracket 20 at the protruding portion 22 with a large normal force can be prevented. Since the protruding portion 22 of the bracket 20 is lowered compared to the plane defined by the rim of the bracket recessed portion 21, a clearance is produced between the bracket 20 and the washer 30. In this case, there is a possibility that the screw 40 loosens. Therefore, the elastic member 50 should be preferably provided between the bracket protruding portion 22 and the washer 30.

Each of the vehicular jig recessed portion 11 and the bracket recessed portion 21 is formed in a shape having an opening wider than its bottom. A side wall face of each of the vehicular jig recessed portion 11 and the bracket recessed portion 21 is formed in a shape inclined from the bottom toward the opening. Thus, a contact area between the vehicular jig 10 and the bracket 20 is increased. The present invention is not limited to this structure. An object of the present invention can be attained also in the case where the wall faces of the vehicular jig recessed portion 11 and the bracket recessed portion 21 are not inclined.

The washer 30 is formed with a washer screw hole 33 at a position corresponding to the vehicular jig screw hole 13 and the bracket screw hole 23, a fixing portion 34 extending at least from the bracket protruding portion 22 to the outer periphery of the bracket recessed portion 21 and the like.

Figure 3:
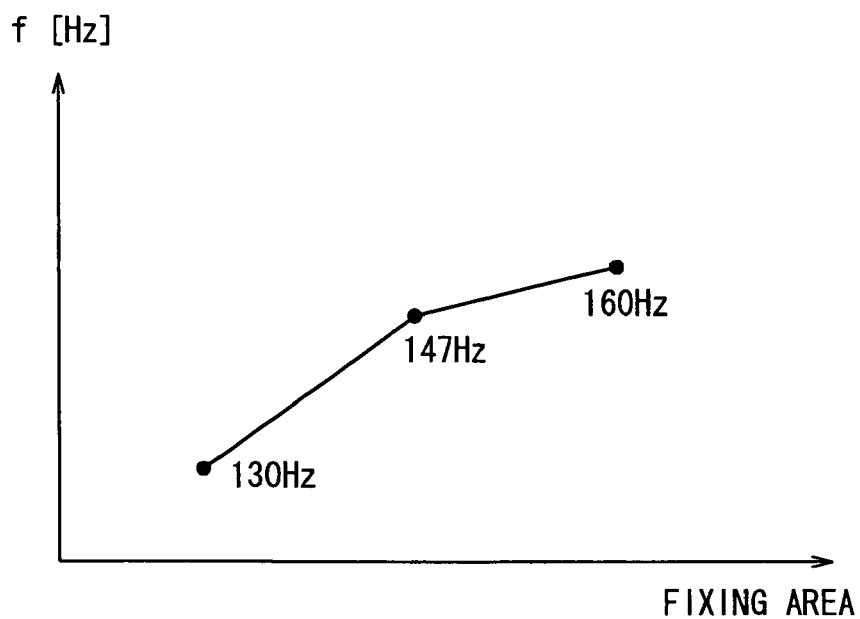
FIG. 3 is a graph showing a relationship between a fixing area and resonance frequency according to the FIG. 1 embodiment.
Figure 4:
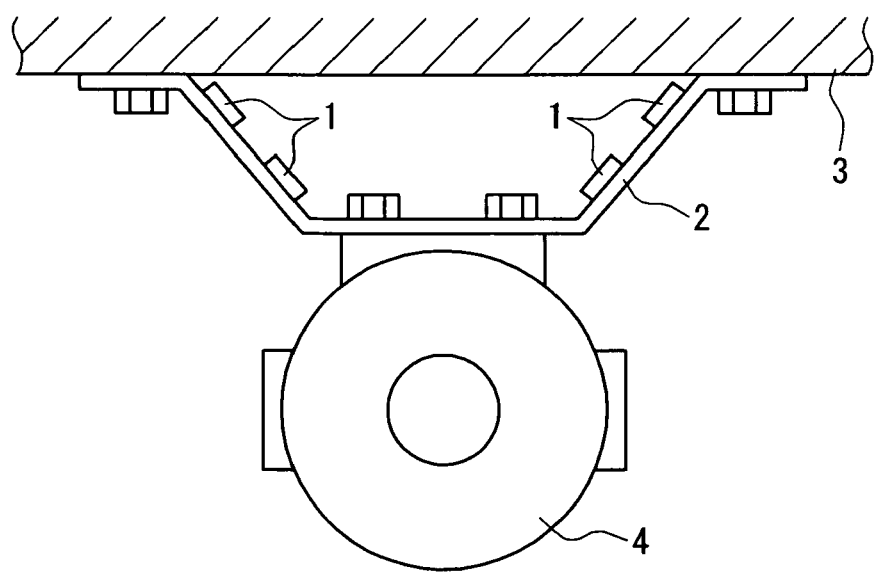
FIG. 4 is a schematic view showing a supporting bracket of a prior art.

In the case where the bracket 20 is fixed, vibration amplitude can be reduced by increasing resonance frequency of the bracket 20. Resonance fracture of the bracket 20 can be inhibited by increasing the resonance frequency over a fundamental frequency of a vibration source such as the engine of the vehicle. An area (fixing area) in which the bracket is fixed to the attachment member is one of factors deciding the resonance frequency f. As shown in FIG. 3, the resonance frequency f can be increased by increasing the fixing area.

Therefore, in the present embodiment, the bracket recessed portion 21 is inserted into the vehicular jig recessed portion 11, and the washer 30 is put on the fate of the bracket 20 through the elastic member 50 on a side opposite from the contact face of the bracket 20 contacting the vehicular jig 10. In this state, the bracket 20 is fixed by inserting the screw 40 into the washer screw hole 33, the elastic member screw hole 53, the bracket screw hole 23 and the vehicular jig screw hole 13 from the side opposite from the contact face of the washer 30 contacting the bracket 20.

By fixing the bracket 20 as described above, the fixing area can be increased and the resonance frequency can be increased. As a result, the vibration of the bracket 20 can be damped economically. By damping the vibration of the bracket 20, the resonance fracture of the bracket 20 can be inhibited.

In the above-described embodiment, the vehicular jig recessed portion 11 and the bracket recessed portion 21 are continuous annular recessed portions respectively. Alternatively, each of the vehicular jig recessed portion 11 and the bracket recessed portion 21 may be a partly continuous recessed portion.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A bracket fixing structure comprising:
   an attachment member formed with an annular attachment member recessed portion, an attachment member protruding portion surrounded by the attachment member recessed portion, and an attachment member screw hole in the attachment member protruding portion;
   a bracket formed with an annular bracket recessed portion, which corresponds to the attachment member recessed portion, a bracket recess rim, which surrounds the bracket recessed portion on an upper surface of the bracket, a bracket protruding portion, which is surrounded by the bracket recessed portion, and a bracket screw hole in the bracket protruding portion;
   a screw; and
   a washer formed with a washer screw hole and a fixing portion extending at least from the bracket protruding portion to an outer periphery of the bracket recessed portion, wherein
   the bracket is fixed by inserting the bracket recessed portion into the attachment member recessed portion, by putting the washer on a face of the bracket that is opposite to a contact face of the bracket that contacts the attachment member, and by inserting the screw into the washer screw hole, the bracket screw hole and the attachment member screw hole from a side of the washer that is opposite to a contact face of the washer, which contacts the bracket,
   the bracket protruding portion is formed such that a top face of the bracket protruding portion is recessed with respect to a plane defined by the bracket recess rim thereby forming a clearance between the top face of the bracket protruding portion and the washer,
   the attachment member recessed portion and the bracket recessed portion are each continuously recessed, and
   only an outer peripheral area of the washer, which is radially spaced apart from the washer screw hole, contacts the bracket when the bracket is fixed to the attachment member by the screw.

2. The bracket fixing structure as in claim 1, further comprising: an elastic member between the bracket protruding portion and the washer.

3. The bracket fixing structure as in claim 1, wherein the attachment member recessed portion and the bracket recessed portion have wall faces formed such that openings of the recessed portions are wider than bottoms of the recessed portions, respectively.

4. The bracket fixing structure as in claim 1, wherein
   the attachment member is a fixing jig attached to a vehicle, and
   the bracket is fixed with a sensor unit.

5. The bracket fixing structure as in claim 1, wherein
   the attachment member is a fixing jig attached to a vehicle, and
   the bracket is fixed with a motor.

6. The bracket fixing structure according to claim 1, wherein the washer is planar.

7. The bracket fixing structure according to claim 1, wherein the screw includes a threaded shaft and a head, and the head applies force over an annular area of the washer when the screw is fastened to the attachment member.

8. The bracket fixing structure according to claim 1, wherein the screw includes a head, and the bracket and the washer are located between the head of the screw and the attachment member.

9. The bracket fixing structure according to claim 1, wherein the screw includes a threaded shaft and a head, and the head applies force over an annular area of the washer, and the washer applies force to an annular area of the bracket when the screw is fastened to the attachment member.

10. The bracket fixing structure according to claim 1, wherein a radially inner part of the washer, which defines the washer screw hole, is spaced apart from the bracket in an axial direction of the screw when the bracket is fixed.

* * * * *